(12) United States Patent
Grasselli

(10) Patent No.: US 10,875,202 B2
(45) Date of Patent: Dec. 29, 2020

(54) INDUSTRIAL SLICER HAVING AUTOMATIC ADJUSTMENT OF THE POSITION OF THE BLADES

(71) Applicant: GRASSELLI S.P.A., Albinea (IT)

(72) Inventor: Giorgio Grasselli, Albinea (IT)

(73) Assignee: GRASSELLI S.P.A., Albinea (IT)

(*) Notice: Subject to any disclaimer, the term of this patent is extended or adjusted under 35 U.S.C. 154(b) by 0 days.

(21) Appl. No.: 16/037,084

(22) Filed: Jul. 17, 2018

(65) Prior Publication Data
US 2019/0030740 A1 Jan. 31, 2019

(30) Foreign Application Priority Data
Jul. 31, 2017 (IT) .................. 102017000087899

(51) Int. Cl.
| | | |
|---|---|---|
| *B26D 1/52* | (2006.01) | |
| *A22C 17/00* | (2006.01) | |
| *B26D 7/06* | (2006.01) | |
| *B26D 7/26* | (2006.01) | |
| *B26D 3/28* | (2006.01) | |
| *B26D 7/30* | (2006.01) | |

(52) U.S. Cl.
CPC ............ *B26D 1/52* (2013.01); *A22C 17/0033* (2013.01); *B26D 3/28* (2013.01); *B26D 7/0625* (2013.01); *B26D 7/2628* (2013.01); *B26D 7/30* (2013.01); *B26D 2210/02* (2013.01); *B26D 2210/04* (2013.01)

(58) Field of Classification Search
CPC .......... B26D 7/2628; B26D 7/30; B26D 1/52; A22C 17/30
See application file for complete search history.

(56) References Cited

U.S. PATENT DOCUMENTS

| | | | | |
|---|---|---|---|---|
| 357,679 | A * | 2/1887 | Maxwell ................. | B26D 1/52 83/805 |
| 1,062,358 | A * | 5/1913 | Ranger .................... | B26D 1/52 83/806 |
| 2,023,362 | A * | 12/1935 | Walma ..................... | B26D 1/52 83/751 |
| 2,254,105 | A * | 8/1941 | Kottman ................. | B26D 1/52 83/751 |
| 4,534,085 | A * | 8/1985 | Stewart .................. | A22C 25/16 452/161 |
| 6,647,848 | B1 * | 11/2003 | Bruner ..................... | B26D 1/52 30/117 |

(Continued)

FOREIGN PATENT DOCUMENTS

| | | |
|---|---|---|
| EP | 2540462 A1 | 1/2013 |
| EP | 2946668 A1 | 11/2015 |
| FR | 2924970 A1 | 6/2009 |

*Primary Examiner* — Omar Flores Sanchez
(74) *Attorney, Agent, or Firm* — Pearne & Gordon LLP

(57) ABSTRACT

An industrial slicer (1) comprises a cutting station (T) that includes: a plurality of blades (21, 22, 23) for slicing a food product (2), the blades (21, 22, 23) being distanceable and nearable to one another in pairs at various reciprocal distances, so as to obtain slices having thicknesses corresponding to said distances; and adjustment means (30, 31, 32, 33, 34, 35, 40, 41, 42, 43, 44, 45) for adjusting said distances and comprising a plurality of adjustment devices (30, 31, 32, 33, 34, 35) that are adapted to act upon respective blades (21, 22, 23), of which at least two of said devices can be activated independently of each other.

26 Claims, 6 Drawing Sheets

(56) References Cited

U.S. PATENT DOCUMENTS

| | | | | |
|---|---|---|---|---|
| 8,220,373 B1 * | 7/2012 | Husting | ................ | B26D 1/553 83/130 |
| 9,751,233 B2 | 9/2017 | Grasselli | | |
| 2015/0336285 A1 | 11/2015 | Grasselli | | |

* cited by examiner

INDUSTRIAL SLICER HAVING AUTOMATIC ADJUSTMENT OF THE POSITION OF THE BLADES

The present invention relates to an industrial slicer.

In particular, the present invention relates to an industrial slicer especially destined for industrial use in the food sector for cutting products such as fowl, meat, fish, vegetables, both fresh and cooked, preferably filleted or without cartilage.

Industrial slicers are known, used to cut food products into slices designed, for example, for large scale retail, for school or company canteens, or for catering.

A known type of slicer comprises a cutting station, a lower conveyor belt for conveying the product to the cutting station, and an upper belt, arranged above the conveyor belt, which has the function of pressing the product.

The cutting station comprises a plurality of blades, sometimes arranged horizontally and other times vertically, under whose blades the conveyor belt extends, so that the product is pushed into contact with the blades and is therefore automatically cut into slices.

The cutting pitch, corresponding to the difference between the blades, is variable as the position of the blades can be changed, so as to be able to obtain slices of a constant thickness, with or without waste.

In machines at present on the market, the reciprocal position between the blades, and therefore the cutting pitch, is manually adjusted.

Therefore, each time the user has to vary the thickness of the slices, the production line must be halted to allow an operator to demount the blades and predispose them at different reciprocal distances.

A further drawback from which these machines suffer is constituted by the fact that the manual intervention on the blades is intrinsically rife with risks for the operator's health, due to the possibility that the operator might be injured during the manoeuvre; in the search to limit the danger, the operator has to be appropriately trained, which, once more, has a significant impact on costs.

For these reasons, the Applicant has developed a machine, which represents one of the many embodiments of the invention protected by European patent no. 2946668, which includes a cutting station with horizontal blades able to cut a chicken breast into slices having the same thickness and further provided with means for automatically varying the cutting pitch, so as to change the thickness of the slices to suit needs.

This machine is equipped with two movable plates in a vertical plane, each provided with a plurality of switching elements, interposed between the blades.

The plates are moved by means of servo mechanisms subject to a processing unit, and, as a function of the displacement of the plates, the blades diverge or converge to one another, thus changing the cutting pitch.

However, in the technical sector to which the invention relates, a need is felt for an industrial slicer able to obtain slices having a constant weight starting from a plurality of food products having variable shapes and dimensions.

Therefore, the technical task underlying the present invention is to provide a slicer machine able to satisfy the above-specified requirements.

The technical task is reached by the slicer machine realised in accordance with claim 1.

Further characteristics and advantages of the present invention will become more apparent from the following indicative, and hence non-limiting, description of a preferred, but not exclusive, embodiment of a slicer, as illustrated in the appended drawings, in which.

Figure 1:
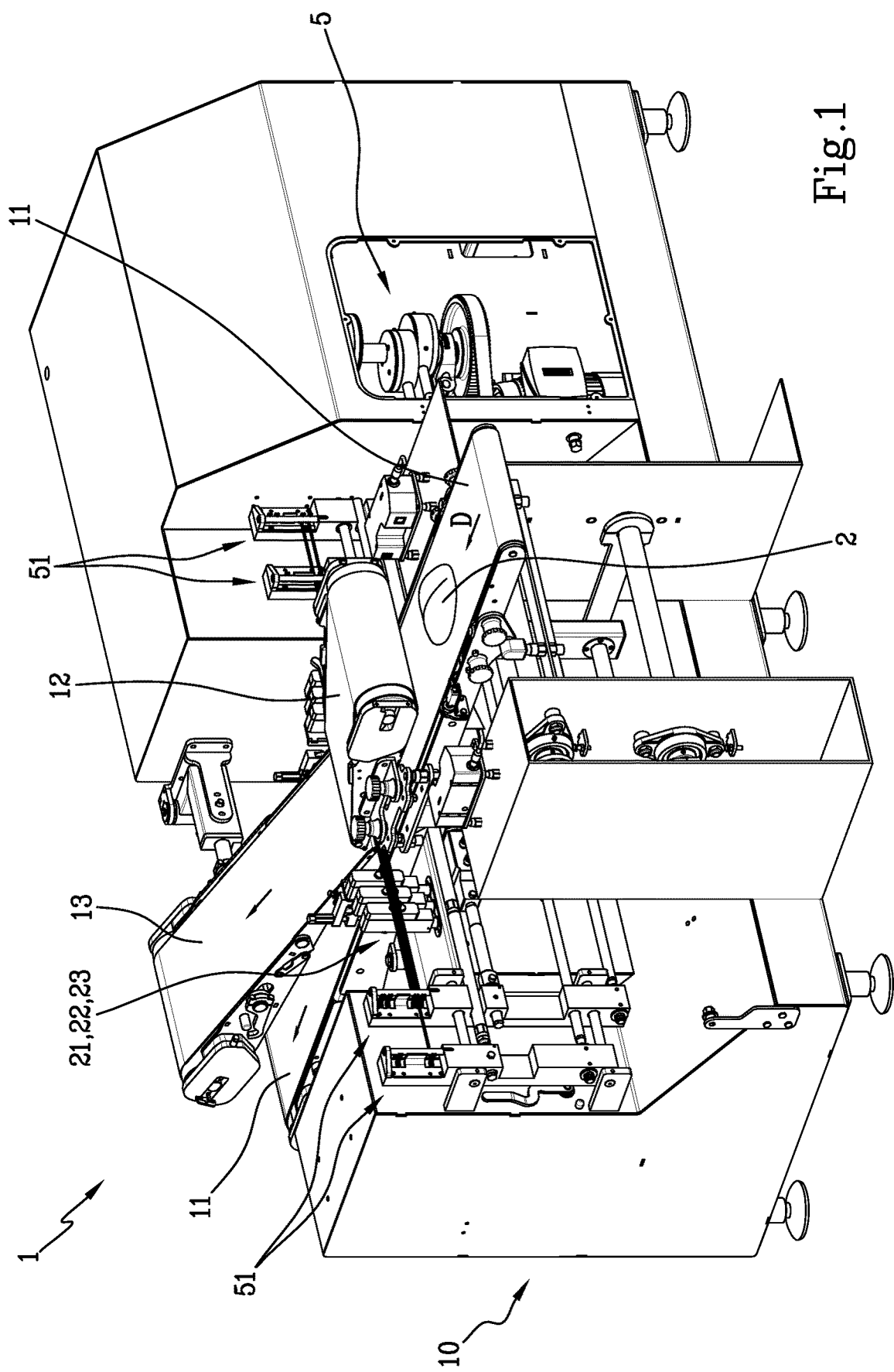
FIG. 1 is an axonometric view of the slicer according to the invention.

With reference to the appended figures reference numeral 1 indicates a slicer machine according to the invention.

Figure 2:
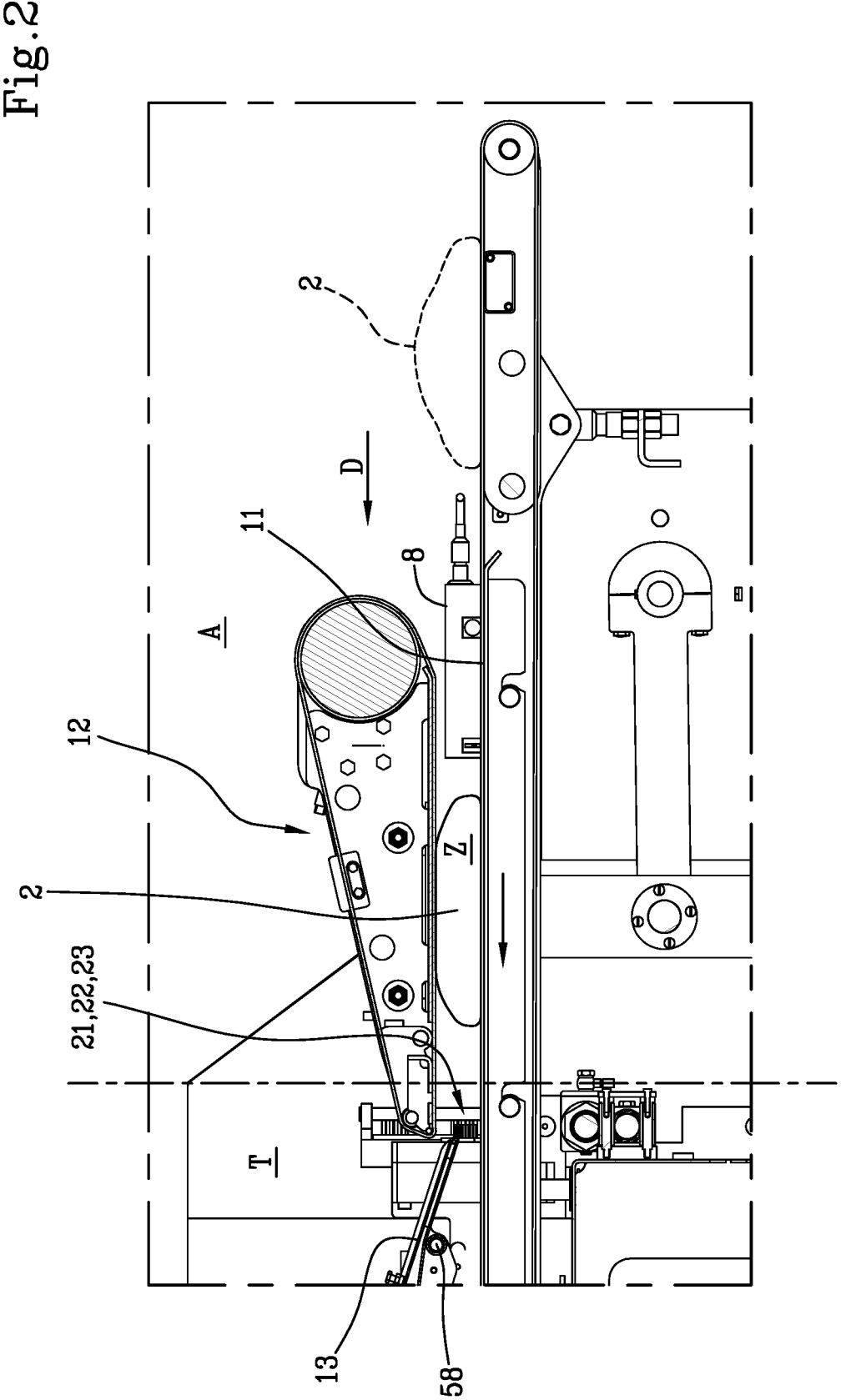
FIG. 2 is a lateral view of a central part of a longitudinal section of the slicer of the preceding figure.

In detail, as mentioned in the foregoing, the slicer 1 of the invention is especially destined for cutting food items 2 such as fowl, meat, fish, vegetables, both fresh and cooked, preferably filleted or without cartilage. The slicer 1 includes a cutting station T, upstream of which an analysis station A is arranged, which feeds the products to be sliced, one at a time to the cutting station T; the subdivision of the two stations T, A, illustrated in FIG. 2, is by way of example and is not obligatory.

Further, the slicer 1 is provided with an outlet, located downstream of the cutting station 1, from which the slices exit from the machine 1.

The various components comprised in the stations T, A in which the machine 1 is hinged, are supported by a support bench 10 that can be rested on the ground.

The machine 1 of the invention comprises a motorised conveyor, which includes a lower conveyor belt 11, preferably horizontal, which crosses the analysis station A and the cutting station T, so as to feed the whole products 2 one by one to the cutting station 1, along an advancement direction denoted by D in the appended figures, then to transport the slices towards the outlet.

A single conveyor belt 11 preferably crosses the above-mentioned stations T, drawing the whole products 2 or the slices in advancement.

The cutting station T comprises a plurality of blades 21, 22, 23 for slicing the products 2 fed to it, which blades 21, 22, 23 are at a variable reciprocal distance (or "cutting pitch") to obtain slices having variable thickness.

The blades 21, 22, 23 can be made of a hard and elastic material, for example steel, and can be quite thin so as to flex in the direction of the thickness.

In the illustrated example, the blades 21, 22, 23 are three in number, having a small thickness, and in any case the invention can also include a single blade or any other type of blade.

The above-mentioned conveyor belt 11, which draws the products 2 resting on the upper surface thereof, can be predisposed in such a way as to extend below the blades 21, 22, 23, so that the product 2 is pushed into contact in order to be sliced (see FIG. 2).

In practice, the conveyor belt 11 defines a horizontal conveyor plane, above which the blades 21, 22, 23 are located, in such a way that upstream thereof the whole product 2 and, downstream, the sliced product 2 are advanced.

According to an important aspect of the invention, the cutting station T includes adjustment means 30, 31, 32, 33, 34, 35, 40, 41, 42, 43, 44, 45 of the reciprocal distance of the blades 21, 22, 23, so as vary the thicknesses of the slices.

The adjustment means of the invention include a plurality of adjustment devices 30, 31, 32, 33, 34, 35 that are adapted to act upon respective blades 21, 22, 23, of which at least two of said devices can be activated independently of each other.

In this way an automatic adjustment of the thicknesses of the slices is obtained, so that the weight of each slice of each single product 2 can be selected prior to operation or the single product can be subdivided into slices of a same weight or of a same thickness.

More precisely, by using the machine 1 of the invention, from a single product 2 a plurality of slices can be obtained all having the same weight or thickness, or a multiplicity of slices can be obtained having the same weight starting from a plurality of products 2 having different shapes and weights.

To understand the technical result obtained by the invention, it is worthwhile to give a brief example of a possible practical use of the invention.

If a chicken breast is to be sliced into two or more slices having the same weight it is cannot simply be separated into halves, for example, to obtain two slices of a same thickness.

In fact, chicken breasts are known to have very irregular shapes and consequently a half-subdivision in the direction of the thickness, but also of the length or width, would certainly produce slices having different weights.

The problem is clearly further complicated in a case in which a multiplicity of slices having a same weight format is desired, starting from a plurality of chicken breasts, which have a shape and weight that are different from one another.

The invention makes available a slicer 1 which not only enables automatically adjusting the cutting distances between the blades 21, 22, 23 for the purposes of determining the thickness of the slices, without the user having to demount and remount the blades each time, but further enables acting on the blades 21, 22, 23 using unconstrained and independent devices, so as to define various cutting pitches for the same product 2, in order to obtain slices that can also be of a different thickness. In practice, the invention enables singly determining the relative position of the blades 21, 22, 23, each blade being able to have different distances from two adjacent blades.

Consequently, the different cutting pitches with which the chicken breasts 2 are sliced, for example, can be determined on the basis of desired parameters, in particular pre-determined weights of the slices and, in even greater detail, the cutting pitches can be selected so as to obtain slices having a constant weight, established by the operator.

For the sake of precision, the invention includes using the information acquired on the whole product 2, while the product passes through the analysis station A where it is scanned and weighed, so that its conformation and density can be calculated, so as to adjust the distances between the blades 21, 22, 23 on the basis of the characteristics of the single product 2 to be sliced, without the operator having to do anything except select the weight and the thickness desired for the slices or choose the functioning mode in which each product 2 is cut into slices, all of the same weight and thus without any waste.

The blades 21, 22, 23 are preferably horizontal and parallel to one another, at least along a section in which the blades come into contact with the products 2; this aspect will be more fully explained during the description of some preferential constructional aspects of the adjustment means of the invention.

It is possible however for the inventive concept illustrated here to be applied in embodiments of the slicer 1 in which it is provided with vertical blades.

In the versions of the invention in which the blades 21, 22, 23 are positioned substantially horizontally, they can be arranged one above another in various positions along a vertical direction, the single blades 21, 22, 23 each being arranged horizontally, so as to cut the product 2 into respective horizontal planes, to define a cut product 2 formed by a plurality of slices superposed in a stack.

In practice, the blades 21, 22, 23 are aligned in an ideal vertical cutting plane, and are mobile along it, according to the action exerted by the adjustment means.

An upper floating belt is preferably located in the feeding station, which floating belt, as shown in FIGS. 1 and 2, is known in itself but not in combination with the other characteristics of the invention.

This is a motorised belt 12, slidable along a closed looped pathway, located above the conveyor belt 11, in order to be facing the conveyor belt 11 and arranged so that the product 2 being carried by the conveyor belt 11 is pressed by the floating belt 12.

The floating belt is connected to a mechanism that adjusts the pressure exerted on the product 2.

The floating belt 12 extends from the feeding station to the cutting station T, so that the conveyed product 2 is sliced while it is pressed; the floating belt 12 preferably extends up to superposing on the blades 21, 22, 23.

Further, an upper waste removal belt 13 can be located in the cutting station T (see FIGS. 1, 2, 3), always facing the conveyor belt 11 and arranged substantially in front of the floating belt 12, the function of which will be detailed in the following, after having illustrated further aspects of the cutting system adopted by the machine 1 of the invention.

In an aspect that is in itself known, the cutting station T comprises movement means 5 adapted to make the blades 21, 22, 23 slide along a direction defined by the longitudinal axis thereof.

In practice, in this type of machine, it is known for the blades 21, 22, 23 to be made to slide longitudinally in a to and fro motion with a predetermined frequency.

In the following a preferential version of the means 5 will be described which enable this oscillating motion of the blades 21, 22, 23; however, note that the slicer 1 of the invention can also use means that are different from the ones illustrated herein.

In any case, the invention advantageously includes that the above-mentioned adjustment means comprise movable guides 40, 41, 42, 43, 44, 45 adapted to enable free sliding of the blades 21, 22, 23, so that the movement of the movable guides 40, 41, 42, 43, 44, 45 causes the variation in the distance between the blades 21, 22, 23 and, as a result, the variation in the thickness of the slices of the product 2 to be cut.

In detail, each blade 21, 22, 23 is interested by at least a movable guide 40, 41, 42, 43, 44, 45 and preferably by two, which at least a movable guide is included in one of the above-mentioned adjustment devices 30, 31, 32, 33, 34, 35.

Therefore, by appropriately adjusting the reciprocal position of the movable guides 40, 41, 42, 43, 44, 45, the cutting distances defined between the blades 21, 22, 23 are automatically determined, thus establishing the thicknesses of the slices.

In practice, each blade 21, 22, 23 slides with reciprocating motion on activation of the above-described movement means 5 and the guides 40, 41, 42, 43, 44, 45 influence the position and progress of the sliding pathway, without interrupting the oscillating motion of the blade.

It is thus clear that the machine 1 of the invention is advantageously able to change the cutting pitches with no need to interrupt the to-and-fro motion of the blades 21, 22, 23, thus being able to change the thicknesses of the slices for each new product 2 that the blades 21, 22, 23 are preparing to cut, uniting the advantages of the automatic adjustment to those of a level of productivity that is not obtainable without the invention. Each blade 21, 22, 23 is preferably fixed at opposite longitudinal end portions thereof to two different supports that are solidly constrained to one another (generally denoted by reference numeral 51 in the appended figures) and translated in the to-and-fro motion already mentioned several times.

In this case, for the purpose of the adjustment of the cutting distances between the blades 21, 22, 23, the property of flexibility, already mentioned in the foregoing, is used; in practice the movable guides 40, 41, 42, 43, 44, 45, which are unconstrained from the movement means of the blades 21, 22, 23, shift in a transverse direction and, preferably, perpendicularly with respect to the direction of the oscillating motion so as to flex the blades 21, 22, 23, changing the relative position thereof; still more preferably, the movement direction of the guides 40, 41, 42, 43, 44, 45 is vertical.

Figure 3:
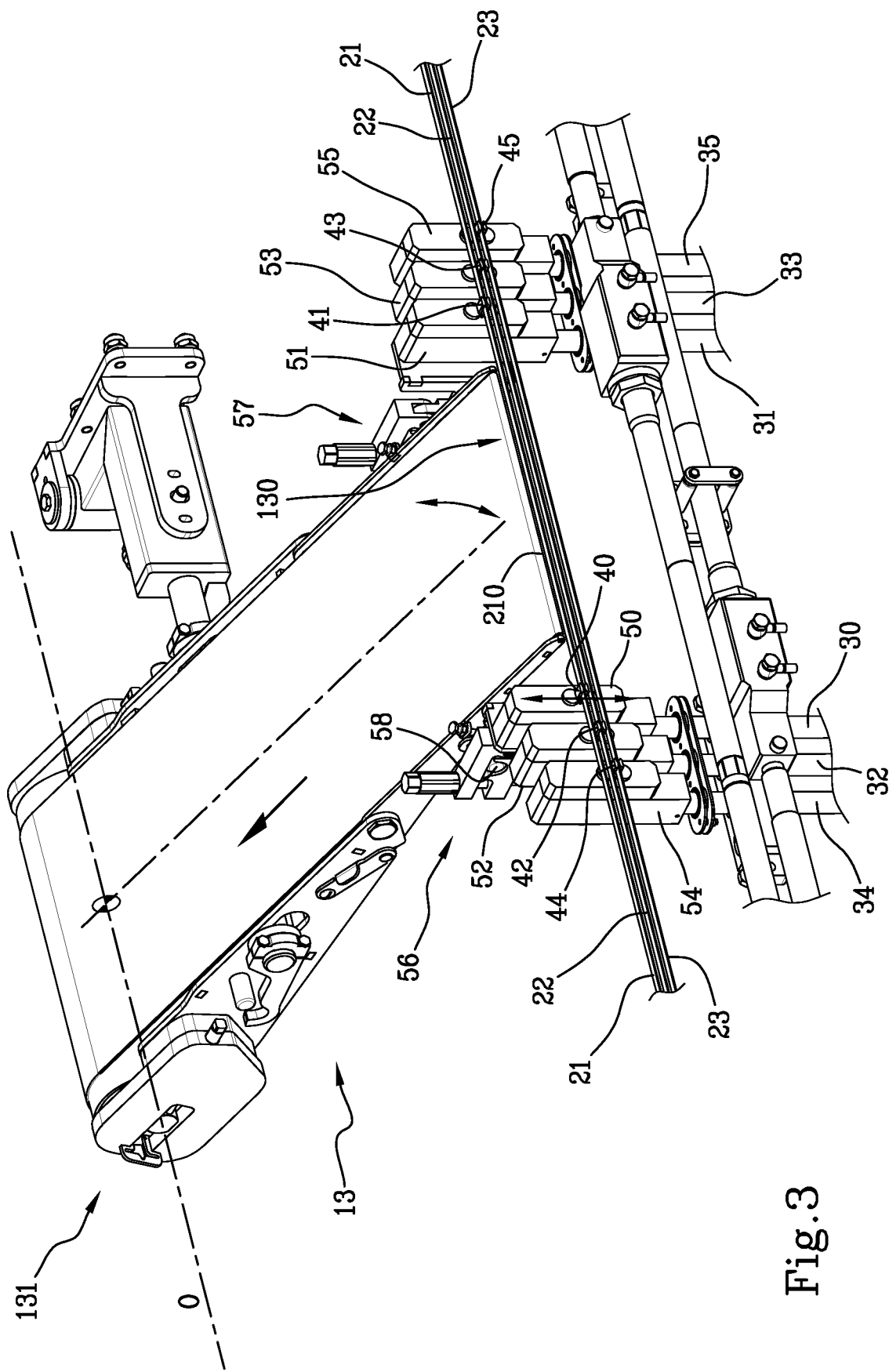
FIG. 3 is an axonometric view illustrating some components of the cutting station of the slicer according to the invention.
Figure 4:
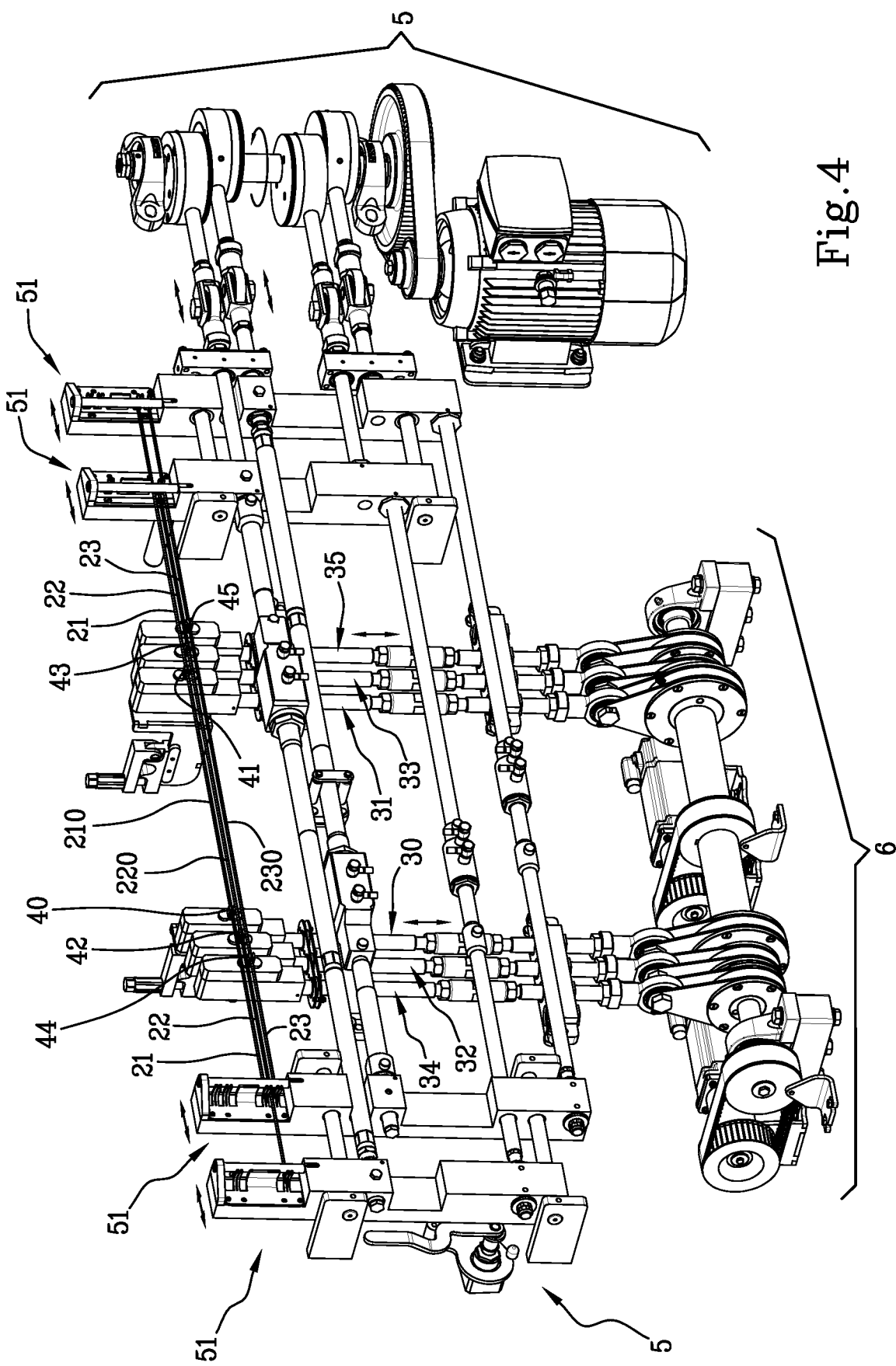
FIG. 4 is an axonometric view illustrating the movement means of the cutting blades equipped in the cutting station above-mentioned.
Figure 6:
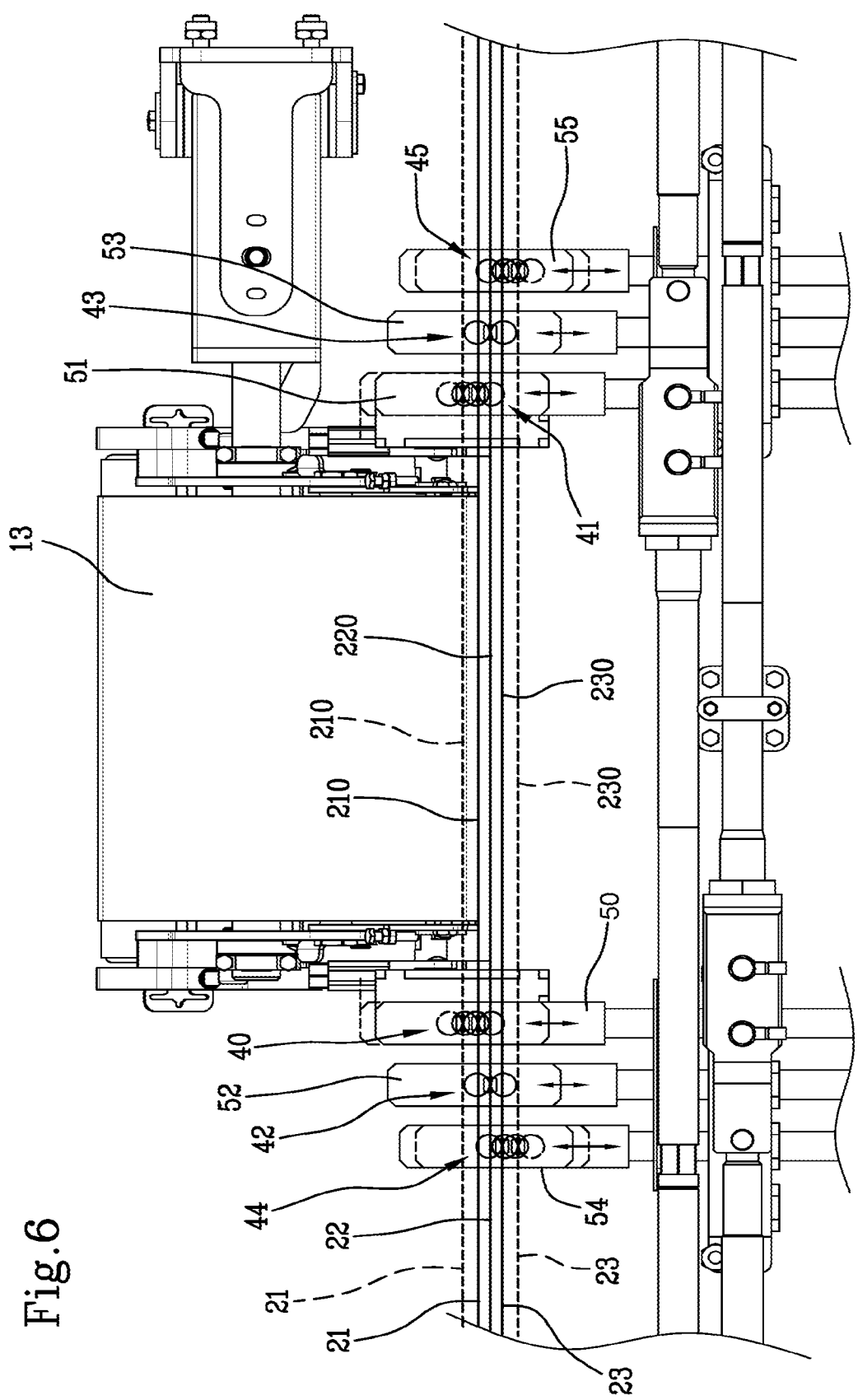
FIG. 6 is a front view schematically illustrating the movement of the blades.

In detail, as illustrated in FIGS. 3, 4 and 6, each blade 21, 22, 23 is preferably involved by two guides 40, 41, 42, 43, 44, 45 separated from one another so as to define between them a central cutting space in which the blade can encounter the product 2 to be cut, drawn to rest on the belt of the conveyor 11.

More precisely, the two guides 40, 41, 42, 43, 44, 45 of each blade are constrained in such a way as to move in a solidly constrained way; the guides 40, 41, 42, 43, 44, 45 acting on the same blade are preferably positioned in a horizontal plane, mobile in a vertical direction.

In this way, the portion 210, 220, 230 of each blade 21, 22, 23 which, instant by instant, is located between the two guides 40, 41, 42, 43, 44, 45, i.e. in the above-described central space, is always horizontal, even though it changes in height; on the contrary, the two opposite lateral portions external of the central space change orientation on the basis of the position of the guides 40, 41, 42, 43, 44, 45, inclining or straightening time by time.

In this preferential embodiment of the invention, the distance or cutting pitch between consecutive blades 21, 22, 23 which has been amply discussed in the foregoing, is the distance defined by the central portions 210, 220, 230 of the blades 21, 22, 23, corresponding to the thickness of the cut slices.

The central portion of the cutting plane, as defined in the foregoing, common to the central spaces of the blades 21, 22, 23, i.e. to the physical space comprised between the guides 40, 41, 42, 43, 44, 45, constitutes a cutting area, which the whole products 2 cross to be subdivided into slices. This cutting area is located immediately above the conveyor belt 11 of the products 2, at the start of the cutting station T as can be seen in FIG. 2. The guides 40, 41, 42, 43, 44, 45 can comprise a pair of contact elements, for example constituted by profiled blocks, placed in contact, with play, with opposite sides of the relative blade.

Note that the cutting elements or block can be made in a like way to the switcher elements described in European patent no. 2946668.

The pairs of opposite blocks are at a distance such as to contain the blade 21, 22, 23, enabling axial sliding thereof.

Embodiments are possible in which the contact elements of each blade 21, 22, 23 are not made available in pairs, and the action thereof in adjusting the distance between the blades 21, 22, 23 is not carried out according to the guide function illustrated in relation to the preferred embodiment of the invention.

In any case, each profiled block preferably comprises a curved contact surface intended for abutment with the respective blade.

As mentioned in the foregoing, the blades 21, 22, 23 are hooked to relative pairs of supports 51 at points close to the longitudinal ends thereof; at or in great proximity to the hooking points, the two supports can include elastic clamps, for example made of steel, adapted to fasten the blades 21, 22, 23 21, 22, 23.

The configuration of these clamps can also be alike to what is described in European Patent 2946668.

The supports preferably comprise vertical plates 81, 82, 83, 84 to which the blades 21, 22, 23 are fixed, and which can form the above-mentioned clamps.

In this case, the clamps can be identified by horizontal slots made on the plates 81, 82, 83, 84, to define thin strips constituting the mentioned jaws. Each blade 21, 22, 23 is supported by two plates provided at the top of the supports 51 (which it can also have in common with other blades) which are subject to the action of hydraulic pistons, or like devices, which are adapted to position and maintain the plates at a reciprocal distance that is such as to tension the blade according to known ways.

Following this operation, each pair of plates, together with the blade or blades coupled thereto, becomes a solidly constrained unit, adapted to translate laterally and rigidly, as partly explained in the foregoing.

The above-mentioned alternating motion of the blades 21, 22, 23 is obtained by displacing the relative plates via a connecting rod shaft, such as the one shown in FIGS. 1 and 4, activated by a relative motor.

In detail, the shaft can be configured to move the different solidly constrained units as previously defined based on cycles involving periods of equal duration but staggered.

These solidly constrained units can be interleaved so that one of the plates which supports one of the blades 21, 22, 23 is interposed between the plates supporting two different blades 21, 22, 23 and vice versa.

The following includes further preferential structural and functional aspects of the adjustment means used in the cutting station T of the slicer 1 of the invention.

Each adjustment device comprises an elongated shifting element 30, 31, 32, 33, 34, 35 that is guided so as to be slidable only vertically.

Each shifting element 30, 31, 32, 33, 34, 35 comprises, at a free top end, an upper head 50, 51, 52, 53, 54, 55 which for example is constituted by a metal block, to which is fixed, or which forms, one of the movable guides 40, 41, 42, 43, 44, 45 already mentioned several times.

In the illustrated example, since three blades 21, 22, 23 are shown, the invention includes six shifting elements 30, 31, 32, 33, 34, 35 and six heads 51, 52, 53, 54, 55.

The upper heads 51, 52, 53, 54, 55 are borne by the rod-shaped vertical shifting members 30, 31, 32, 33, 34, 35 which receive the vertical shifting motion from mechanical transmission means 6, illustrated in particular in FIG. 5 and described in the following in detail.

From the foregoing, and observing the figures of the appended tables of drawings, it can be observed how the position in which the shifting elements 30, 31, 32, 33, 34, 35 are borne directly determines the reciprocal distances between the blades 21, 22, 23 and, for the above-stated reasons, also the thickness of the slices.

In the case of a use of three blades, at least two shifting elements 30, 31, 32, 33, 34, 35, or two groups of elements, are unconstrained and independent of one another, and for this reason, in the embodiment illustrated in the figures, two electric motors 61, 62 are illustrated, which regulate the movement thereof.

In general, the invention includes electromechanical actuators which act on the above-mentioned transmission means so as to determine the position of the shifting elements and, consequently, of the blades 21, 22, 23.

In the illustrated example, for reasons that will be clarified during the description of the operation of the invention, the highest blade 21 is independent of the other two blades 22, 23, the latter two being moved together; in general, all the blades 21, 22, 23 can be independent of one another, and it is possible to include assemblies or groups of blades with dependent movement, in turn independent of and unconstrained from other groups or other single blades.

The motors are preferably connected to respective shafts, for example arranged horizontally, on which one or more eccentric elements are fitted which are singly connected to respective shifting elements, the angular position of each of which eccentric element corresponds to a position in a vertical direction of the relative shifting element.

In the embodiment illustrated in the appended figures, two concentric shafts 63, 64 are included, rotationally unconstrained.

Figure 5:
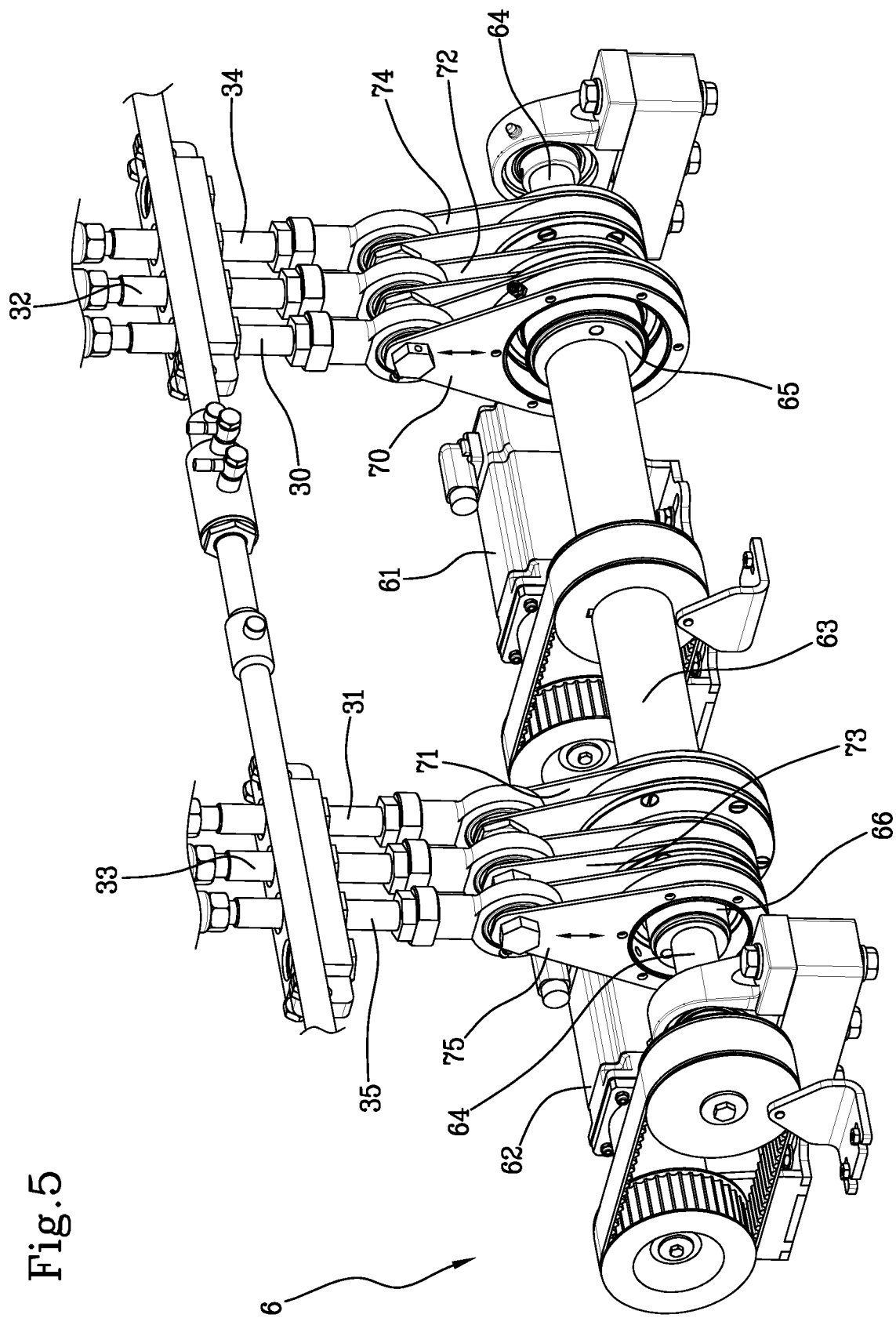
FIG. 5 is an axonometric view of a part of the means of the preceding figure.

The external shaft 63 has the eccentric elements 65 fitted, which regulate the shifting of the movable guides 40, 41 which act on the upper blade 21, while the internal shaft 64 is joined to the eccentric elements 66 which establish the position of the guides 42, 43, 44, 45 of the two lower blades 22, 23; in FIG. 5 the covers of the eccentric elements 65, 66 have been removed.

Each shifting element 31, 32, 33, 34, 35 is fixed, at a lower end thereof opposite the above-mentioned head 51, 52, 53, 54, 55 provided with a guide 40, 41, 42, 43, 44, 45, and at the lower end, to an attachment member 70, 71, 72, 73, 74, 75 which, in the version illustrated in the figures, has a connecting rod shape.

The attachment member 70, 71, 72, 73, 74, 75 is provided with a ring in which a respective eccentric element 65, 66 acts; in detail, the external edge of the eccentric element 65, 66 is in contact with the internal edge of the ring, so that an angular displacement of the shaft corresponds to a translation in a vertical direction of the shifting element 31, 32, 33, 34, 35. In a special embodiment of the invention, the upper waste removal belt 13 is connected to the two heads 50, 51 provided with guides 40, 41, which regulate the upper blade 21 (see in particular FIG. 3).

For the sake of precision, the waste removal belt 13 is able to oscillate, drawn by the heads 50, 51, so that the front end 130 thereof is always at a constant distance with respect to the upper blade 21, regardless of the position thereof.

For the sake of precision, the waste removal belt 13 is hinged to the rear end 131 opposite the front end which receives the waste cut by the upper blade 21; thus the oscillation of the waste removal belt 13 is a sort of pitching about a horizontal axis O which passes through the rear longitudinal end 131 of the belt 13, which is preferably located in a position in which it is always at a higher level than the opposite front end 130.

Further, the front end 130 of the waste removal belt 13 is very close to the central portion 210 of the upper blade 21, for example slightly higher than the central portion 210 and parallel thereto, so as to directly receive the waste while it is being cut, and to distance the waste by activation of the electromechanical actuators which move the belt 13.

Each of the two heads which bear the guides 40, 41, 42, 43, 44, 45 which move the upper blade preferably has connection brackets 56, 57, which are hinged to the waste removal belt 13, about a horizontal axis, which passes through a point that is separate but not distant from the edge of the front end.

In still greater detail, the waste removal belt 13 can have, at opposite flanks, two lateral spurs 58 which extend in said horizontal axis and which are gripped, rotatably, in respective clamps with which the two connection brackets 56, 57 are provided.

Further functional aspects of the waste removal belt 13 will be detailed during the explanation of the operation of the invention.

As illustrated in FIG. 2, the analysis station A preferably comprises at least a scanning device 8, predisposed to detect the shape and dimensions of products 2 to be sliced which are moved in single file by the conveyor belt 11 and a weighing device (not illustrated) for detecting the weight of the products 2 to be sliced.

The weighing device, which in itself can be of a known type, as it can comprise, for example, one or more load cells, is preferably associated to the conveyor belt 11 so as to weigh the products 2 which are rested thereon.

The slicer 1 of the invention also includes a processing unit, connected to the scanning device 8 and to the weighing device, and is configured to determine the distances between the blades 21, 22, 23 which enable cutting the scanned and weighted product 2, into slices having predetermined weights, for example a same weight.

In general, it is to be noted that, in the present description, the processing unit is presented divided into distinct functional modules for the sole purpose of describing the functions thereof in a clear and complete manner.

In practice, the processing unit can consist of a single electronic device, even of the type commonly found on this type of machine, duly programmed to perform the functions described, and the various modules can correspond to hardware and/or routine software units belonging to the programmed device.

Alternatively or additionally, such functions may be performed by a plurality of electronic devices over which the aforesaid functional modules can be distributed.

In general, the processing unit can make use of one or more microprocessors for performing the instructions contained in memory modules and the aforesaid functional modules may, also, be distributed over a plurality of local or remote calculators on the basis of the architecture of the network in which they reside.

The processing unit is connected to the scanning device 8 and to the weighing device, and is configured to determine the distances between the blades 21, 22, 23 which are such as to enable cutting the scanned and weighted product 2, into slices having predetermined weights, for example a same weight.

The scanning device 8 preferably comprises at least a laser sensor adapted to detect a multiplicity of external surface profiles of the product 2 to be sliced and to produce profile signals representative of the surface profiles detected.

For example, two facing laser sensors can be used, located on opposite sides of the conveyor belt 11 and facing one another so as to scan the products 2 from opposite sides.

In still greater detail the two sensors can be positioned in such a way as to scan the products 2 to be sliced when the products 2 pass into an analysis zone Z defined between the floating belt 12 and the lower conveyor belt 11, before reaching the blades 21, 22, 23.

The processing unit is advantageously adapted to receive the above-mentioned profile signals and comprises a shape module configured to map the external conformation of the product 2 to be cut, on the basis of the profile signals.

In this case, the processing unit also comprises a volume module configured to calculate the overall volume of the product 2 to be cut, according to the profile signals.

A processing unit can also comprise a density module configured to determine the density of the product 2 on the basis of the weight acquired by the weighing device and the volume, as calculated in the foregoing.

In greater detail, the weighing device is adapted to produce weight signals, a function of the weights of the products 2 which pass through the analysis station A, and to transmit them to the processing unit.

Therefore a subdividing module can be included, configured to calculate, as a function of the density, volume and conformation of the external surface of each product 2, the thicknesses of the slices into which to subdivide the product 2, so that the slices have predetermined weights.

In this case, the subdividing module can be configured to produce the adjustment signals according to the calculated thicknesses, which signals are transmitted to the above-mentioned motors 61, 62 which adjust, via the transmission means, the positions of the regulating means 30, 31, 32, 33, 34, 35, 40, 41, 42, 43, 44, 45; differently, the motors 61, 62 themselves are adapted to receive the adjustment signals and to vary the position of the shifting elements 30, 31, 32, 33, 34, 35, as a function of the signals.

In this way, the position of the movable guides 40, 41, 42, 43, 44, 45 changes on the basis of the processing performed by the subdividing module, to obtain from each product 2 weighed and scanned slices having desired weights, for example, substantially the preset weight.

In more general terms, the processing unit is configured to produce adjustment signals adapted to vary the distances between the blades 21, 22, 23 and wherein said actuators 61, 62 are adapted to receive said adjustment signals and thus move the adjustment devices accordingly.

In fact, the invention, as mentioned in the foregoing, is extremely flexible as it enables obtaining stacks of slices, all either of the same thickness or all having the same weight, on the basis of the characteristics of the single product 2, all without producing waste; or the invention cuts the products 2 into slices all of the same weight regardless of the shape, dimensions and weight of the products, in which case an amount of waste will be created. In practice, on the basis of a first calculating mode, selectable by the user, once the weight, shape and volume of a given product 2 have been determined, the subdividing module calculates the distances between the blades 21, 22, 23 which are adapted to produce, from that specific product 2, slices of a uniform weight without creating waste.

In this case, the slices into which a certain product 2 is subdivided will have different weights from those realised starting from a different product 2.

Otherwise, the subdividing module, following a selection made by the user, can function in a second calculating mode in which it determines the distance between consecutive blades adapted to subdivide the single product 2 analysed into slices all of the same thickness, without producing waste.

In this case, the slices of different products 2 will have different thicknesses although each of the products 2 has been subdivided into slices of a uniform thickness.

The user can also set an "objective weight", a sort of format, which all the slices produced starting from a series of products 2 to be sliced must have.

In this case, the subdividing module works in a third calculating mode in which it determines, time by time, on the basis of the characteristics of the product 2 scanned, what the distances between the blades must be for the slices to always have a same prefixed weight, even though the products from which they are fashioned have different characteristics.

In practice, the subdividing module is selectable in such a way as to pass from one calculating mode to another, on the basis of selections made by the user, for example via a user interface of which more in the following.

A possible operation of the invention is described in the following, starting from the assumption of wishing to obtain a multiplicity of slices of chicken breasts, all substantially of the same weight, starting from a plurality of chicken breasts 2.

Obviously, from each chicken breast 2 more than one slice can be obtained of the determined weight, even though, before analysing it via the processing unit, it cannot be precisely known how many; obviously, in all concrete cases, the chicken breast 2 will comprise enough meat for the slices of the prefixed weight plus an amount of waste.

The breasts 2 are fed one by one from the machine 1 and first pass through the analysis station A, drawn by the lower conveyor belt 11; during this step, the breasts 2 are weighed by the appropriate device as described herein above.

When a breast 2 reaches the analysis zone Z defined between the conveyor belt 11 and the floating belt 12, which compresses the product 2, it is scanned by the laser sensors 8, while it continues to advance in the direction of the cutting station T.

The processing unit receives in input signals representing the weight of the product 2 and the profiles along various ideal longitudinal sections of the product 2.

The processing unit calculates, for each product 2, the thicknesses of the slices into which to subdivide the breast 2 so that they have the same weight, plus a waste that is the excess of meat constituted by a portion of top of the product 2, variable on the basis of the shape and dimensional characteristics of the product 2.

In real-time, the processing unit commands the motors 61, 62 which in the cutting station T make the respective shafts 63, 63 rotate, connected to the eccentric elements 65, 66 which determine the positioning of the shifting elements 30, 31, 32, 33, 34, 35, and from this the correct positioning of the movable guides 40, 41, 42, 43, 44, 45, so that the cutting blades 21, 22, 23 have the specific distances or "cutting pitches" that determine the thickness of the slices.

This step is repeated for each product 2, so that the positions of the blades 21, 22, 23 change on the basis of the single breast to be cut, in such a way that by varying the thickness of the slices according to the conformation and dimensions of each product 2, slices of a same weight are always obtained.

More precisely, the upper blade 21 is located in the position in which it will cut the waste to separate it from the group of slices arranged below; in practice the cut of the upper blade 21 superiorly defines the waste and inferiorly the upper surface of one of the slices, i.e. the part that will be the top of the stack once the breast has been completely sliced.

As mentioned, the upper waste removal belt 13 follows the upper blade 21, in the sense that the feed edge thereof oscillates in rotation while remaining solidly constrained to the blade 21.

The waste finishes on the waste removal belt 13 and is borne away therefrom.

Thus, the product 2 has been sliced and the group of superposed slices are borne by the conveyor belt 11 towards the outlet.

The invention also includes a user interface, connected to the processing unit, configured for enabling an operator to set or select representative parameters of the desired slices, at least a parameter preferably being representative of the weights or the weight of the desired slices.

In greater detail, among settable parameters there are those which determine the calculating mode of the subdividing module listed and discussed above.

In practice, by acting on the interface, the operator chooses whether the weight of each slice obtained from a plurality of products 2 is fixed and determined previously by the operator or whether the single product 2 is subdivided into slices all of a uniform weight or whether the slices of the single product 2 must all be of the same thickness.

The interface can be provided with control means which include keyboards, touchscreen displays, buttons, levers or the like, activatable for the purposes of setting/selecting of said parameters; the activation of the control means determines, from the interface, the production of setting signals that are a function of the parameters.

The invention claimed is:

1. An industrial slicer (1) comprising a cutting station (T) that includes:
   a plurality of blades (21, 22, 23) for slicing a food product (2), said blades (21, 22, 23) can be spaced apart and drawn closer to each other in pairs so as to vary their distances with respect to each other, so as to obtain slices of said product (2) having thicknesses corresponding to said distances; and
   adjustment means (30, 31, 32, 33, 34, 35, 40, 41, 42, 43, 44, 45) for adjusting said distances and comprising a plurality of adjustment devices (30, 31, 32, 33, 34, 35) that are adapted to act upon respective blades (21, 22, 23), of which at least two of said devices can be activated independently of each other; and
   wherein the blades (21, 22, 23) are made of a flexible and elastic material;
   wherein the cutting station (T) comprises a plurality of actuators (61, 62) arranged so as to move at least two adjustment devices (30, 31, 32, 33, 34, 35) independently; and
   wherein said actuators comprise electric motors (61, 62) and wherein the cutting station (T) includes a transmission means (6) that is connected to said motors and to said shifting elements (30, 31, 32, 33, 34, 35) and adapted to move the shifting elements in translational motion upon actuation of the motors so as to adjust said distance between the blades (21, 22, 23).

2. The slicer (1) according to claim 1, wherein the blades (21, 22, 23) are parallel.

3. The slicer (1) according to claim 1, wherein the blades (21, 22, 23) are arranged substantially horizontally.

4. The slicer (1) according to claim 1, wherein each adjustment device (30, 31, 32, 33, 34, 35) comprises at least one contact element (41, 42, 43, 44, 45) adapted to come into contact with a lateral surface of the respective blade (21, 22, 23).

5. The slicer (1) according to claim 4, wherein each device comprises two contact elements (41, 42, 43, 44, 45) arranged in such a manner as to come into contact with opposite surfaces of the relative blade (21, 22, 23).

6. The slicer (1) according to claim 1, wherein at least two contact elements (41, 42, 43, 44, 45) are provided for each blade and arranged so as to come into contact with the blade at different points on the same side.

7. The slicer (1) according to claim 1, wherein the adjustment devices (30, 31, 32, 33, 34, 35) are adapted to move in translational motion along a direction transverse to the direction of longitudinal extension of the respective blades (21, 22, 23).

8. The slicer (1) according to claim 1, wherein said cutting station (T) comprises movement means (5) adapted to make the blades (21, 22, 23) slide, the adjustment means comprising, for each blade, at least one movable guide (41, 42, 43, 44, 45) that is apt for enabling the relative blade to slide freely and that is associated with one of said adjustment devices, the movement of the movable guides (40, 41, 42, 43, 44, 45) causing the variation in the distance between the blades (21, 22, 23) and, as a result, the variation in the thickness of the slices.

9. The slicer (1) according to claim 8, wherein each adjustment device (30, 31, 32, 33, 34, 35) comprises at least one contact element (41, 42, 43, 44, 45) adapted to come into contact with a lateral surface of the respective blade (21, 22, 23), and wherein each guide (41, 42, 43, 44, 45) includes at least one of said contact elements.

10. The slicer (1) according to claim 1, wherein each adjustment device comprises an elongated shifting element (30, 31, 32, 33, 34, 35) that is guided so as to be slidable vertically.

11. The slicer (1) according to claim 8, wherein each adjustment device comprises an elongated shifting element (30, 31, 32, 33, 34, 35) that is guided so as to be slidable vertically, and wherein each shifting element (30, 31, 32, 33, 34, 35) is provided with at least one of said movable guides (40, 41, 42, 43, 44, 45).

12. The slicer (1) according to claim 1, wherein said transmission means includes at least two rotating eccentric elements (65, 66) that are unconstrained with respect to each other and connected to the shifting elements (30, 31, 32, 33, 34, 35) so that the position of the latter is a function of the angular position of the same eccentric elements (65, 66).

13. The slicer (1) according to claim 12, wherein each eccentric element (65, 66) is fitted on a shaft (63, 64) connected to a respective motor (61, 62).

14. The slicer (1) according to claim 13, comprising at least two concentric rotatably unconstrained shafts (63, 64).

15. The slicer (1) according to claim 13, comprising at least three eccentric elements (65, 66), wherein at least two of them are fitted on the same shaft.

16. The slicer (1) according to claim 1, said slicer (1) being provided with an analysis station (A) arranged upstream of the cutting station (T) and comprising:
   at least one scanning device (8) suitable for detecting the shape and dimensions of the product (2) to be sliced; and
   at least one weighing device for detecting the weight of the product (2) to be sliced; wherein a processing unit is comprised in the slicer (1) and connected to said scanning device (8) and to said weighing device, said processing unit being configured to determine distances between the blades (21, 22, 23) that are such as to cut the product (2) into slices having preset weights.

17. The slicer (1) according to claim 16, wherein the processing unit is configured to determine distances of the blades (21, 22, 23) so as to obtain slices having substantially the same weight.

18. The slicer (1) according to claim 16, wherein said scanning device comprises at least one sensor (8) adapted to detect a multitude of external surface outlines of the product (2) to be sliced and to produce outline signals representing said detected outlines, said processing unit being adapted to receive said outline signals and comprising a shape module configured to determine an external shape of the product (2) to be cut and a volume module configured to calculate a volume of the product (2) to be cut.

19. The slicer (1) according to claim 16, wherein the processing unit comprises a density module configured to determine a density of the product (2) based on the relative weight acquired by said weighing device and on the relative volume.

20. The slicer (1) according to claim 19, wherein said processing unit comprises a subdivision module configured to calculate, as a function of the density, the volume and the shape of the external surface of each product (2), distances between the blades (21, 22, 23) adapted to subdivide this product (2) so that the slices have preset weights and/or preset thicknesses.

21. The slicer according to claim 20, wherein said subdivision module has a first calculation mode, in which, for each product (2) to be sliced, the distances between the blades (21, 22, 23) are determined individually so that the various products (2) are cut, obtaining slices therefrom having the same preset weight.

22. The slicer according to claim 20, wherein the subdivision module has a second calculation mode, in which, for each product (2) to be sliced, it determines the distances between the blades (21, 22, 23) so that all the slices of that product (2) are of the same weight.

23. The slicer according to claim 20, wherein the subdivision module has a third calculation mode, in which, for each product (2) to be sliced, it determines a distance between the blades (21, 22, 23) which is such that the slices of that product (2) are of the same thickness.

24. The slicer according to claim 21, wherein the subdivision module can be selected so as to pass from one calculation mode to the other.

25. The slicer (1) according to claim 1, said slicer (1) being provided with an analysis station (A) arranged upstream of the cutting station (T) and comprising:
   at least one scanning device (8) suitable for detecting the shape and dimensions of the product (2) to be sliced; and
   at least one weighing device for detecting the weight of the product (2) to be sliced;
   wherein a processing unit is comprised in the slicer (1) and connected to said scanning device (8) and to said weighing device, said processing unit being configured to determine distances between the blades (21, 22, 23) that are such as to cut the product (2) into slices having preset weights, and wherein the processing unit is configured to produce adjustment signals adapted to vary the distances between the blades (21, 22, 23) and wherein said actuators (61, 62) are adapted to receive said adjustment signals and for moving the adjustment devices (30, 31, 32, 33, 34, 35) accordingly.

26. The slicer (1) according to claim 13, said slicer (1) being provided with an analysis station (A) arranged upstream of the cutting station (T) and comprising:
   at least one scanning device (8) suitable for detecting the shape and dimensions of the product (2) to be sliced; and
   at least one weighing device for detecting the weight of the product (2) to be sliced;
   wherein a processing unit is comprised in the slicer (1) and connected to said scanning device (8) and to said weighing device, said processing unit being configured to determine distances between the blades (21, 22, 23) that are such as to cut the product (2) into slices having preset weights, wherein the processing unit comprises a density module configured to determine a density of the product (2) based on the relative weight acquired by said weighing device and on the relative volume, wherein said processing unit comprises a subdivision module configured to calculate, as a function of the density, the volume and the shape of the external surface of each product (2), distances between the blades (21, 22, 23) adapted to subdivide this product (2) so that the slices have preset weights and/or preset thicknesses, wherein said subdivision module has a first calculation mode, in which, for each product (2) to be sliced, the distances between the blades (21, 22, 23) are determined individually so that the various products (2) are cut, obtaining slices therefrom having the same preset weight, wherein the processing unit is configured to produce adjustment signals adapted to vary the distances between the blades (21, 22, 23) and wherein said actuators (61, 62) are adapted to receive said adjustment signals and for moving the adjustment devices (30, 31, 32, 33, 34, 35) accordingly, and wherein said subdivision module is configured to produce said adjustment signals in accordance with said thicknesses and wherein said motors (61, 62) are adapted to receive the adjustment signals and for varying the position of the shifting elements (30, 31, 32, 33, 34, 35) as a function of said signals.

* * * * *